United States Patent

Hoffmeyer

[11] Patent Number: 5,309,645
[45] Date of Patent: May 10, 1994

[54] COMBINATION PLUMB OR LEVEL AND HEIGHT SETTING INSTRUMENTS

[76] Inventor: Randal V. Hoffmeyer, 40374 William, Sterling Heights, Mich. 48313

[21] Appl. No.: 135,075

[22] Filed: Oct. 12, 1993

[51] Int. Cl.⁵ .............. G01C 5/04; G01C 9/18
[52] U.S. Cl. .................. 33/367; 33/372; 33/382; 33/354
[58] Field of Search .............. 33/367, 370, 371, 372, 33/373, 377, 382, 354

[56] References Cited

U.S. PATENT DOCUMENTS

| | | | |
|---|---|---|---|
| 986,109 | 3/1911 | Weymouth | 33/367 X |
| 2,789,365 | 4/1957 | Houge | 33/367 |
| 4,231,163 | 11/1980 | Turloff | 33/367 |
| 4,691,445 | 9/1987 | Fields, Jr. | 33/367 |
| 4,991,302 | 2/1991 | Brewer | 33/367 |
| 5,255,443 | 10/1993 | Schmidt | 33/373 |

Primary Examiner—William A. Cuchlinski, Jr.
Assistant Examiner—Alvin Wirthlin
Attorney, Agent, or Firm—John R. Benefiel

[57] ABSTRACT

An instrument set for plumbing or leveling and relative height setting of members such as posts or beams, each instrument including orthogonal sides and a feature projecting from the top of one side allowing each instrument to be set atop a respective post with the orthogonal sides against the post and a rabbeted feature on the bottom of one side allowing the instruments to be set atop a beam. Bubble levels on the sides of at least one of the instruments enable plumbing of a post or leveling of a beam, and open topped sight tubes attached to each instrument and interconnected with a water filled hose enable height setting with the same instruments.

8 Claims, 2 Drawing Sheets

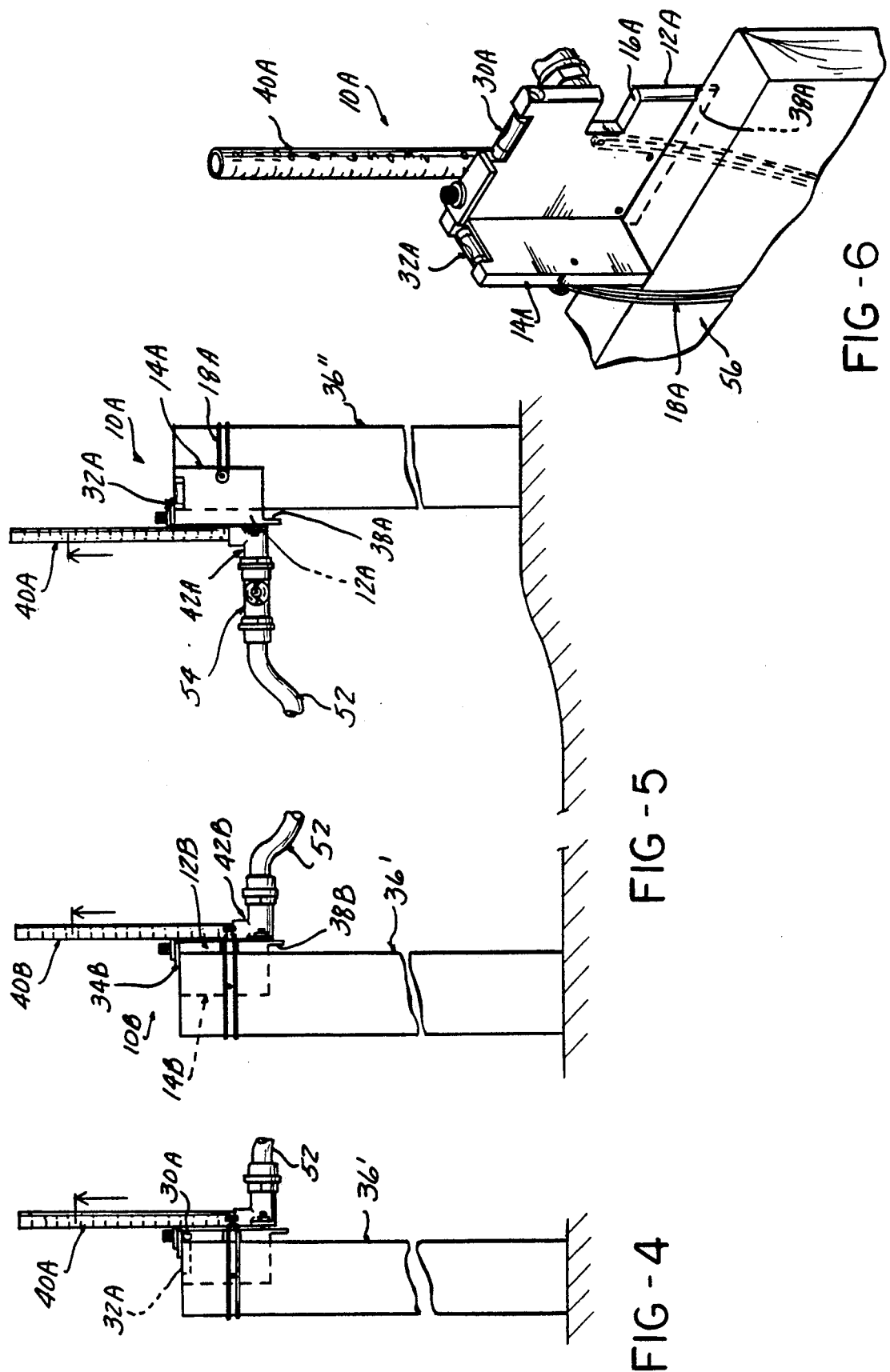

COMBINATION PLUMB OR LEVEL AND HEIGHT SETTING INSTRUMENTS

BACKGROUND OF THE INVENTION

This invention concerns instruments for setting posts or beams so as to be both plumb or level and at a predetermined height relationship with other posts or beams being set.

There has heretofore been developed angled side instruments having a bubble level mounted on each side of the angled side instrument, the instrument adapted to be held against two sides of a round or square post such as a 4×4 or 6×6. The post is thus able to be set plumb by centering the bubble of each level extending in two orthogonal directions to set the plane of the top of the post horizontal.

It often is required to set the height of a number of posts relative each other, as when constructing a post supported deck. This must be done by using other devices or techniques, as by leveling a long piece of lumber between the posts. Line levels are also sometimes used. These techniques are slow and inaccurate.

There has also long been used water level devices in which a water filled flexible hose connects two sight tubes, the level of water in each tube being the same to enable height comparison of two widely separated posts or other structural member.

See U.S. Pat. No. 4,991,302 issued on Feb. 12, 1991, for an "Open Circuit Levelling Measuring System" and U.S. Pat. No. 4,686,773 issued on Aug. 18, 1987 for a "Structure Leveling System" for examples of these systems.

Use of these devices require a separate set up, also slowing completion of the project.

While water level devices have sometimes been provided with bubble levels, these have been only used to plumb the tubes. See U.S Pat. No. 4,231,163 issued on Nov. 4, 1980, for a "Level Indication and Elevation Indicating Device" and U.S. Pat. No. 318,885 issued on May 26, 1885 for a "Device for Leveling Aligning Shafts".

It is the object of the present invention to provide instruments which conveniently enable establishing both plumb or level, and a predetermined height relationship between posts, or a level or predetermined slope and relative height of horizontally extending structural members such as beams.

SUMMARY OF THE INVENTION

These and other objects of the invention which will become apparent upon a reading of the following specification and claims are achieved by a set of two instruments, each instrument having orthogonal sides adapted to be fit and secured against the side of a post with the undersurface of a projecting feature projecting from one side allowing resting the instrument on the top of a post. At least one of the instruments has a bubble level mounted atop each side portion which allow plumbing of the post. Both instruments have open topped graduated sight tubes mounted vertically on an outer face of one side, with a water filled hose interconnecting the bottoms of each tube. Thus, by setting the instrument on the top of spaced apart posts, and viewing the water level in each tube, the height of each post can also be set relative each other.

Accordingly, both plumbing and height setting of posts can be accomplished with this set of instruments.

The instruments are also rabbetted along one side to allow convenient use in setting the slope or leveling beams which also can have their relative height set to further increase the versatility of the instrument set.

DESCRIPTION OF THE DRAWINGS

FIG. 4 is a side elevational view of a first post being plumbed with an instrument according to the invention.

FIG. 5 is a side elevational view of first and second spaced apart posts having the set of instruments according to the invention installed on the top of respective posts for setting the plumb of the second post and the relative height of the first and second posts.

FIG. 6 is a perspective view of one of the instruments in use to level a beam.

DETAILED DESCRIPTION

In the following detailed description, certain specific terminology is utilized for the sake of clarity and a particular embodiment described in accordance with the requirements of 35 USC 112, but the same is not intended to be limiting and should not be so construed inasmuch as the invention is capable of taking many forms and variations within the scope of the appended claims.

Figure 1:
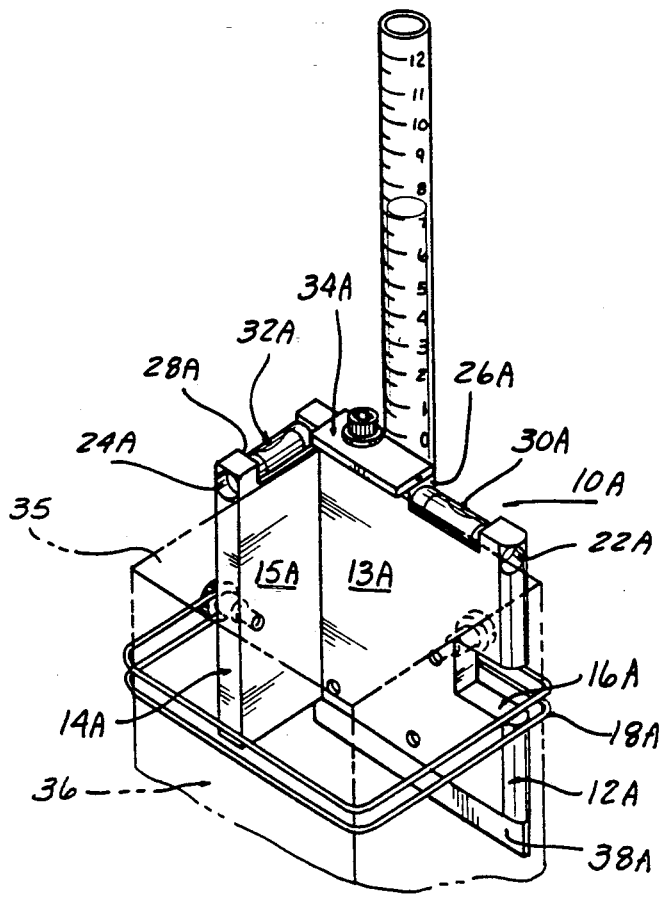
FIG. 1 is a perspective view of one of the instruments according to the present invention, with a phantom line depiction of the top of a post on which the instrument rests.
Figure 2:
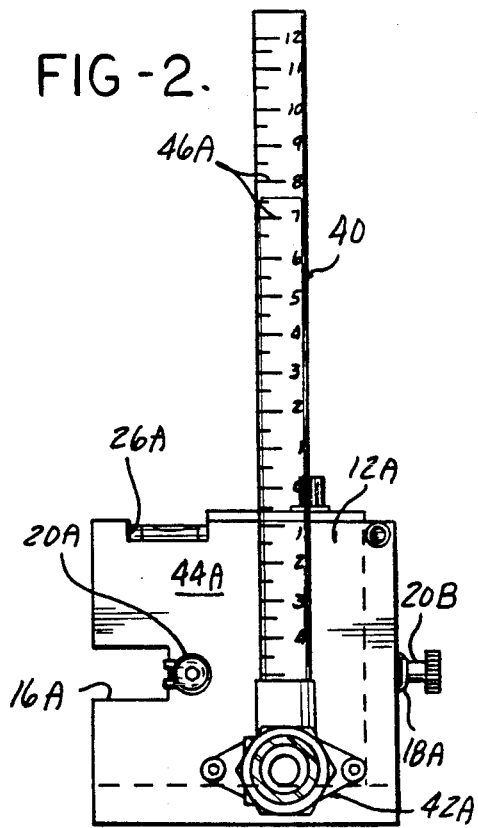
FIG. 2 is a front elevational view of the instrument shown in FIG. 1.
Figure 3:
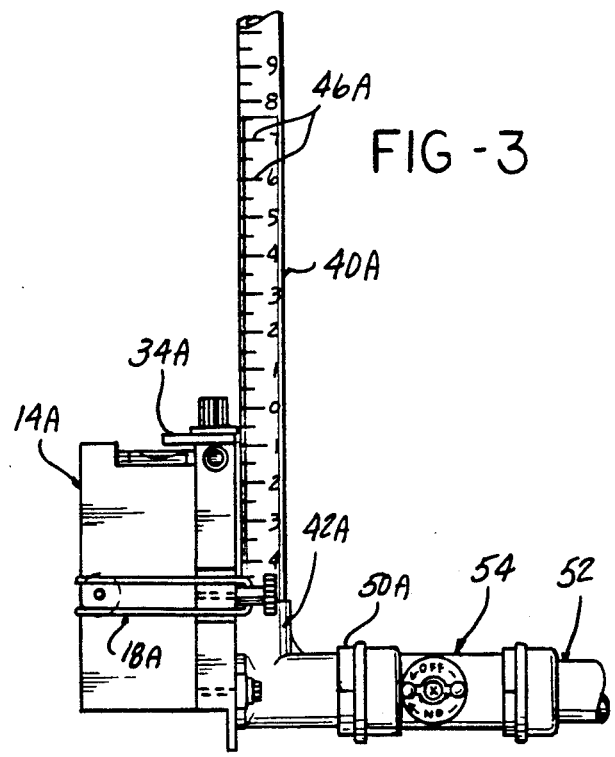
FIG. 3 is a side elevational view of the instrument shown in FIGS. 1 and 2.

Referring to the drawings, according to the concept of the invention, a pair of generally similar angle sided instruments 10A, 10B are provided in a set, the primary instrument 10A shown in FIGS. 1-3. Angle sided instrument 10A, which can be made of various materials such as metal or plastic, has a pair of orthogonally extending sides 12A, 14A, with one side 12A longer than the other side 14A The longer side can be slotted at 16A to allow an elastic strap 18A, anchored on pins 20A, 20B on the respective sides 12A, 14A to engage a vertical structural member such as a square post having sides shorter than the longer side 12A, or a round post having a diameter shorter than the longer side 12A.

This slotted feature is shown in U.S. Pat. No. 5,207,004 issued May 4, 1993, for a "Post Level".

The top of each side 12A, 14A has a respective bore 22A, 24A extending along the length thereof. A respective notched out area 26A, 28A allows viewing from the top or side of tubular bubble level vials 30A, 32A fitted into a respective bore 22A, 24A.

Affixed to the top of the longer side 12A is a projecting feature comprised of a top plate 34A fixed to the top of side 12A and extending over the inside face 13A so that the instrument 10A can be located and rest on the top 35 of the post 36 being plumbed, to fit against inside surfaces 13A 15A of the sides 12A and 14A.

A lengthwise rabbeting cut out 38A extends along the bottom of the longer side 12A on the inside for a use to be described below.

An open topped transparent sight tube 40A is mounted in a right angle fitting 42A affixed to the outer face 44A of the longer side 12A so as to be vertically projecting. The tube 40A is preferably graduated by means of markings 46A.

The fitting 42A includes a suitable hose coupling 50A preferably for receiving an ordinary garden hose 52 attached via a shutoff valve fitting 54. The interior of the tube 40A is connected via internal passages in fitting 42A to the garden hose 52.

In FIG. 4, instrument 10A is shown set atop a first post 36' so that the first post 36' can be set plumb using bubble levels 30A, 32A.

In FIG. 5, instrument 10A is shown used to plumb a second post 36". The second instrument 10B is positioned atop the first post 36'. The corresponding components of the second instrument are identified with the same reference numerals, with letter suffix "B". The water level in the respective tubes 40A, 40B can be conveniently viewed to set the relative height of the posts 36', 36" since the tubes 40A, 40B are connected with a common length of garden hose 52, filled with water.

Shutoff valve 54 when closed allows convenient movement of the instruments 10A, 10B without spillage of the water due to shifting of the relative elevations.

The instrument 10B optionally is not provided with bubble levels, as it may only be used for height setting. Or, both can be so equipped and used interchangeably.

FIG. 6 shows primary instrument 10A used to set the level of a horizontally extending beam 56, with the beam 56 conveniently fit into the rabbet 38A. This aligns the long side 12A with the length of the beam 56 and with an elastic strap 18A stably positions the same for increased versatility in use for construction and other uses. Both instruments 10A, 10B can also be used mounted at either end of the beam 56 to set a predetermined slope of the beam 56. This is done using the sight tubes 40A, 40B as described above with respect to the posts 36', 36". The height relationship of two or more separate beams can also be set using the sight tubes 40A, 40B as described in connection with the posts 36', 36".

I claim:

1. A combination plumb and height instrument set, comprising:
    a first instrument having two sides extending orthogonally to each other, having respective inner faces adapted to be both placed against a vertical structural member;
    a feature extending from at least one side into the included space between said inner faces of said two sides, said feature adapted to rest on a horizontal surface of a first vertical structural member against which said inner face of each of the two sides are placed, to be located on the first member at a predetermined position thereon;
    a pair of bubble levels each mounted to extend along a respective side of said first instrument and readily viewable when said instrument is in said predetermined position on said first member to thereby allow plumbing of said first vertical structural member;
    a second instrument having two sides extending orthogonally to each other, having respective inner faces adapted to be both placed against a vertical structural member; a feature extending from at least one of said two sides into the included space between said inner faces of said two sides and adapted to rest on a horizontal surface of a second vertical structural member in a predetermined position thereon;
    an open topped first sight tube and means mounting said first sight tube to said first instrument to extend vertically up with said first instrument when on said first vertical structural member;
    an open topped second sight tube and means mounting said second sight tube to said second instrument to extend vertically up with said second instrument in said predetermined position when on said second vertical structural member;
    a fluid filled hose extending between said first and second sight tubes, said fluid partially filling both sight tubes to enable height comparison between said first and second vertical structural members.

2. The instrument set according to claim 1 wherein said sight tubes are each marked with height graduations.

3. The instrument set according to claim 1 wherein said bubble levels are mounted to be exposed along the top edge of each of said sides of said first instrument.

4. The instrument set according to claim 3 wherein one of said two sides of each of said first and second instruments is longer than the other side, and said means mounting said first and second sight tubes comprises a fitting affixed to an outer surface of each of said longer sides.

5. The instrument set according to claim 4 wherein said longer side of each instrument is rabbeted along a lower edge thereof to enable resting on a horizontal beam to enable setting the level or slope thereof using at least one of said instruments.

6. The instrument set according to claim 4 wherein said longer side of each instrument has a slot extending in from a side edge thereof, and a mounting pin projects from said outer face thereof adjacent said slot for anchoring an elastic strap.

7. The instrument set according to claim 4 wherein each of said fittings includes a right angled bottom portion threaded to receive a standard garden hose connector.

8. The instrument set according to claim 1 wherein a bore is formed extending into a side edge of each instrument side at the top, a bubble level vial pressed into each bore, and a window cut out in the top of each side entering said bore to enable reading of each of said bubble levels from the side or top.

* * * * *